(12) United States Patent
Crow

(10) Patent No.: US 6,877,537 B1
(45) Date of Patent: Apr. 12, 2005

(54) BICYCLE WHEEL WITH PUNCTURE RESISTANT TIRE LINER

(76) Inventor: Paul Crow, 2723 E. 101st Ave., Thornton, CO (US) 80229

( * ) Notice: Subject to any disclaimer, the term of this patent is extended or adjusted under 35 U.S.C. 154(b) by 0 days.

(21) Appl. No.: 09/629,360

(22) Filed: Aug. 1, 2000

(51) Int. Cl.$^7$ .............................................. B60C 27/00
(52) U.S. Cl. ........................ 152/207; 152/200; 156/121; 156/123
(58) Field of Search ................................ 152/195, 512, 152/205, 207, 193, 198, 200, 203, 204; 156/110.1, 123, 121

(56) References Cited

U.S. PATENT DOCUMENTS 5,785,779 A * 7/1998 McGee et al. ............... 152/203

FOREIGN PATENT DOCUMENTS

DE 33 43 306 A1 * 11/1984 ................. 152/205
FR 1.072.160 * 9/1954 ................. 152/207

* cited by examiner

Primary Examiner—Adrienne C. Johnstone

(57) ABSTRACT

A protective tire liner positioned between the bicycle inner tube and the bicycle outer tire of a bicycle wheel. The protective tire liner comprises a thin lightweight puncture resistant flexible strip of metallic material, preferably of recycled aluminum to protect the inner tube from puncture damage. The lightweight puncture resistant flexible strip of recycled aluminum has a thickness of 0.002"–0.035". The protective tire liner also includes polyurethane protective tape which is applied to major first and second surfaces of the lightweight puncture resistant flexible strip of recycled aluminum to give added protection against puncture and enhance the strength and durability of the recycled aluminum strip. The polyurethane protective tape prevents the puncture resistant flexible metal strip from accordianing and covers the edges of the puncture resistant flexible metal strip to prevent it from abrading the inner tube.

4 Claims, 2 Drawing Sheets

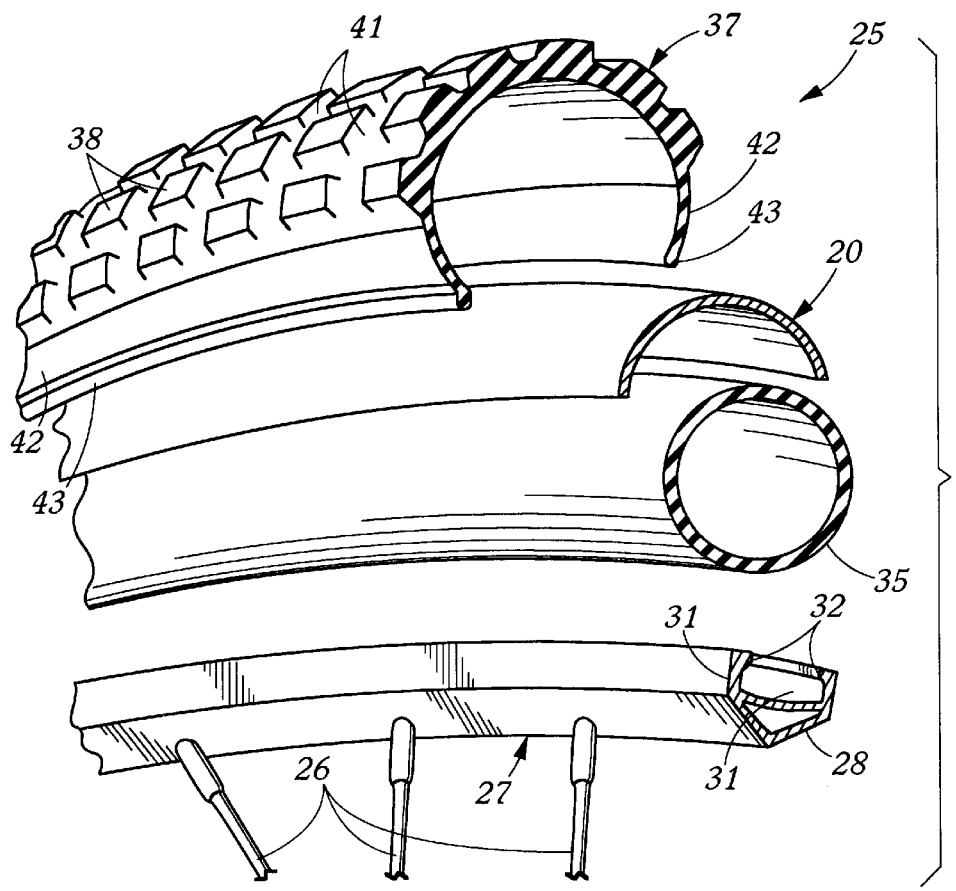
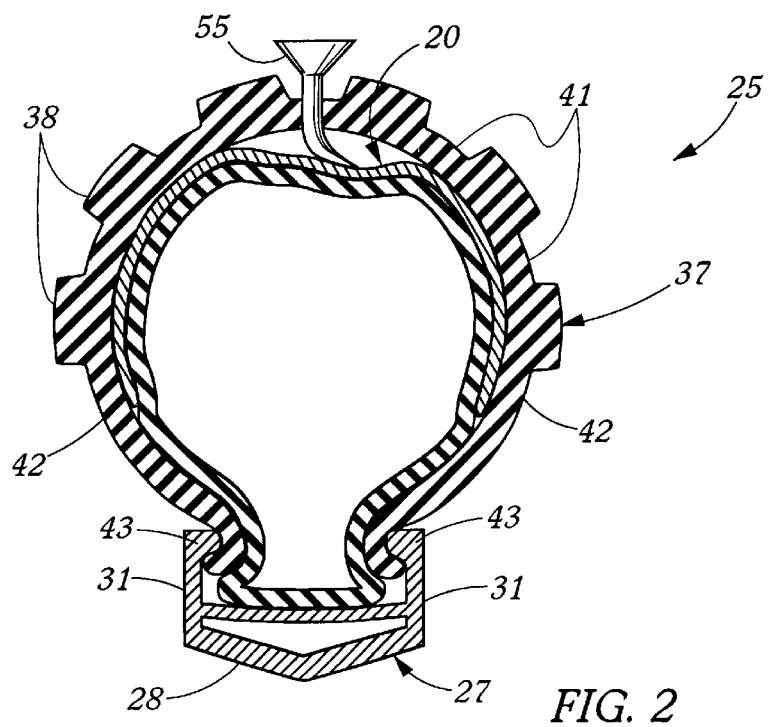

BICYCLE WHEEL WITH PUNCTURE RESISTANT TIRE LINER

BACKGROUND OF THE INVENTION

1. Field of the Invention

The present invention relates generally to bicycle tires and more particularly to a protective liner for a bicycle tire of the pneumatic type to make the tire puncture-proof or at the very least puncture resistant.

2. Description of the Prior Art

Bicycle tires usually have a narrow outer rubber casing having a thin cross-section and an inner, air filled, inner tube. Unfortunately, especially when off road biking, thorns and other sharp objects can easily penetrate the outer rubber casing and puncture the inner tube. Flat tires are a common occurrence for all types of bicycles. Having a flat tire especially on a mountain trail can be a devastating experience leaving the rider stranded without any means of transportation. While many bike riders carry tire repair kits, tools and other devices such as air pumps and sealing materials for repairing flat tires, people often have difficulty in making such repairs especially when the need arises off road or on a mountain trail. In any event, penetration of the outer tire by thorns or other sharp objects resulting in the puncture of the inner tube and a flat is often a very unpleasant and frustrating experience especially if you are in a relatively remote area.

The susceptibility of the pneumatic tire to puncture is inherent in the nature of the elastomeric material that comprise the tire or the tire and the inner tube in the case of a bicycle. When inflated, such elastomeric materials have the well known characteristics of providing both a cushioned ride and also giving greater traction than other materials, while however unfortunately simultaneously having a decreased resistance to sharp objects.

Various proposals have been made as to how this susceptibility to puncture may be avoided with varying degrees of success. Methods which attempt to prevent puncture altogether appear to have been limited to date to so-called tire liners which are attached to the inside of the tire casing or pressurably sandwiched between the casing and an inner tube. In the past such liners have often been expensive and added significantly to the weight of the tire resulting in increased difficulty in propulsion for a cyclist.

Examples of prior art references directed to these problems include: U.S. Pat. No. 520,643 granted on May 29, 1894 to Hoffman relating to a protecting strip adapted to be interposed between the inner and outer tubes of a pneumatic tire with its ends overlapping, said strip consisting of a strip of woven wire fabric and a covering of canvas, the canvas on opposite sides of the strip being united together and to the wire fabric by cement, said cement filling the interstices of the wire fabric. U.S. Pat. No. 600,340 to Thomson & Gibb dated Mar. 8, 1898, in which a metallic band constructed of short lengths of highly tempered steel tape are interlaced or plaited together to form a band of the required width to cover the whole of the puncturable surface of the inner air tube, thereby effectively preventing the puncturing of said tires. U.S. Pat. No. 601,327, granted to Stevenson on Mar. 29, 1898 and relating to an armor or anti-puncture band for pneumatic tires, comprising a series of plates hinged together directly at their meeting ends by metallic fastening devices carried by another series of plates, which are hinged to and overlap the meeting ends of the first named series of plates. U.S. Pat. No. 722,339 granted to Wheeldon on Mar. 10, 1903 relates to an intermediate protecting band adapted to be inserted between the air tube and tread of a pneumatic tire consisting of inner and outer strips of fabric, and a layer of small plain sections of sheet metal fitted together side to side, end to end, and edge to edge between the strips of fabric, and cemented together with the strips of fabric. U.S. Pat. No. 1,177,930 dated Apr. 4, 1916 granted to Henry J. Cohrs relates to a tire protector consisting of a first band of rubber, leather or other flexible material, a second band of rubber, leather or other flexible material and interposed plates of aluminum. Schaefer et al U.S. Pat. No. 1,779,014, relates to a tire insert consisting of several layers or strips of fabric and linen. Hart U.S. Pat. No. 2,205,260 relates to a tire guard consisting of a fabric envelope in which is inserted a flexible metal member. Scimecca U.S. Pat. No. 3,982,577 relates to a tube guard being located when in use between the inner tube and an outer rubber tire casing and comprising a singular annular guard member made entirely from a non-compressible flexible solid plastic material. McGee et al. U.S. Pat. No. 5,785,779 relates to a protective tire liner comprising a puncture resistant strip formed from a plurality of tightly woven fabric layers of Kevlar yarn and since the Kevlar yarn is abrasive a plastic covering layer is spirally wound about the the puncture—resistant flexible yarn to cover at least the side edges thereof. One of the difficulties with fabric and Kevlar, is that a sharp object or thorn will find its way through the weave and penetrate the tube.

Unfortunately, despite the various attempts to provide puncture resistant devices until the present invention, there still existed a need for a practical lightweight and effective device for protecting a bicycle tire, particularly, a mountain bicycle tire from punctures and other damage that cause flats.

SUMMARY OF THE INVENTION

In view of the foregoing background, it is therefore an object of the present invention to provide a protective tire liner for a bicycle tire that is practical, effective, inexpensive, readily manufactured and lightweight.

These and other objects, advantages and features of the present invention are provided by a protective tire liner positioned between the bicycle inner tube and the bicycle outer tire of a bicycle wheel. The protective tire liner comprises a thin lightweight puncture resistant flexible strip of metallic material, preferably of aluminum, and more preferably of recycled aluminum to protect the inner tube from puncture damage. The lightweight puncture resistant flexible strip of aluminum has a thickness of 0.002"–0.035". The protective tire liner also includes polyurethane protective tape which is applied to major first and second surfaces of the lightweight puncture-resistant flexible strip of aluminum to give added protection against puncture and enhance the strength and durability of the aluminum strip. The polyurethane protective tape prevents the puncture resistant flexible metal strip from accordianing and covers the edges of the puncture resistant flexible metal strip to prevent it from abrading the inner tube. In addition since thorns, glass slivers and other penetrants are usually tapered, having a very sharp point but a flatter wider base. The pointed end enters the outer bicycle tire and as the tire rotates and the base of the penetrant contacts hard surfaces the penetrant is driven deeper into the tire. Without the benefit of the present invention, sooner or later the thorn will travel deep enough into the tire to puncture the air filled inner tube, resulting in a flat tire. Because the thorn is tapered, it cannot back itself out of the tire, but can only travel deeper into the tire, puncturing the inner tube. With the present invention the flexible metallic strip acts as a barricade to stop thorn travel and the polyurethane tape actually holds the thorn or any other penetrant and prevents it from traveling further.

The protective tire liner is for a bicycle wheel of a type including a generally circular bicycle rim, a bicycle inner tube positioned around the bicycle rim, and a bicycle outer tube covering the bicycle inner tube and secured to the bicycle rim. The protective tire liner, the combination of the flexible metallic strip of aluminum and the polyurethane protective tape protects the inner tube from puncture damage, such as from thorns, as are commonly encountered when off road and mountain biking.

BRIEF DESCRIPTION OF THE DRAWINGS

FIG. 1 is an exploded perspective view of a bicycle wheel including a protective tire liner in accordance with the present invention.

FIG. 2 is an enlarged cross-sectional view taken through the assembled wheel portion illustrating the operation of the protective tire liner in accordance with the present invention.

DETAILED DESCRIPTION OF THE INVENTION

Figure 3:
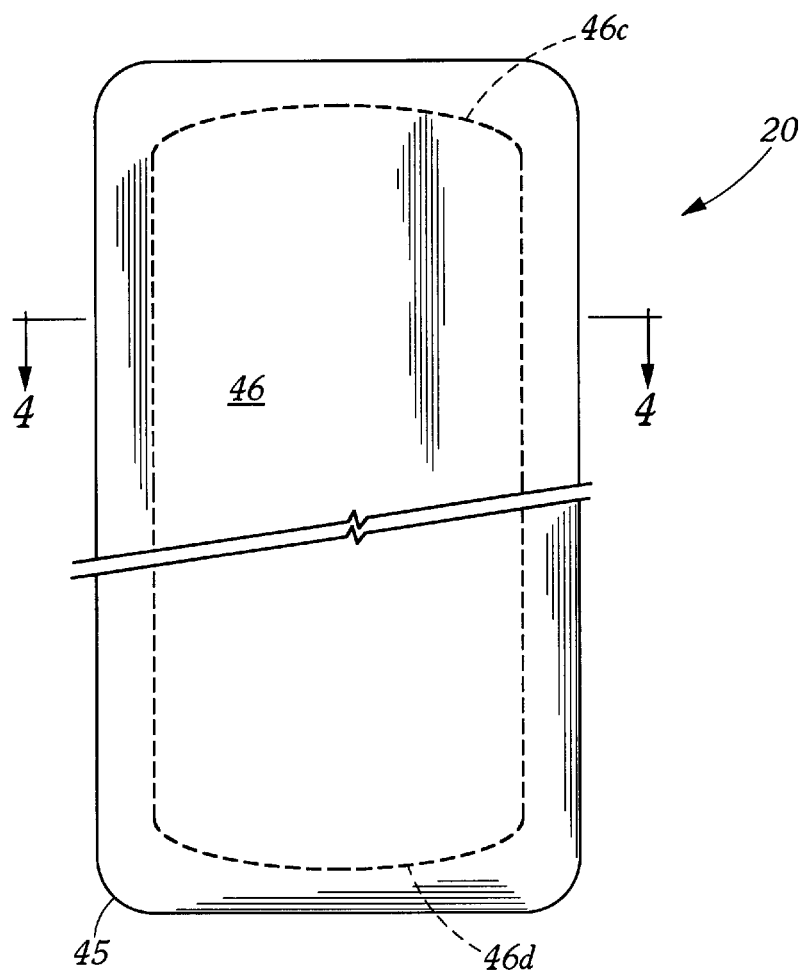
FIG. 3 is a plan view of a protective tire liner in accordance with the invention.

Referring to FIGS. 1–4 a protective tire liner 20 is described. The tire liner 20 is for a bicycle, and more particularly, is for the wheel 25 of a bicycle, such as a mountain bicycle. The wheel 25 includes a plurality of spokes 26 supporting a generally circular rim 27. The rim 27 includes a bottom wall 28, a pair of opposing sidewalls 31, and opposing inwardly extending beads 32 on the ends of the sidewalls. The rim 27 is typically about 0.8 to 1.3 inches wide.

The wheel 25 also includes the bicycle inner tube 35 and the bicycle outer tube 37. The inner tube 35 is preferably formed from rubber and has a wall thickness in a range of about 0.03 to 0.12 inches. The outer tire 37 is preferably made from rubber and includes an outer tread portion defined by alternating knobs 38 and valleys 41. The outer tire also includes a lower sidewall portion 42 terminating in an outwardly extending molded bead as would be readily understood by those skilled in the art.

Figure 4:
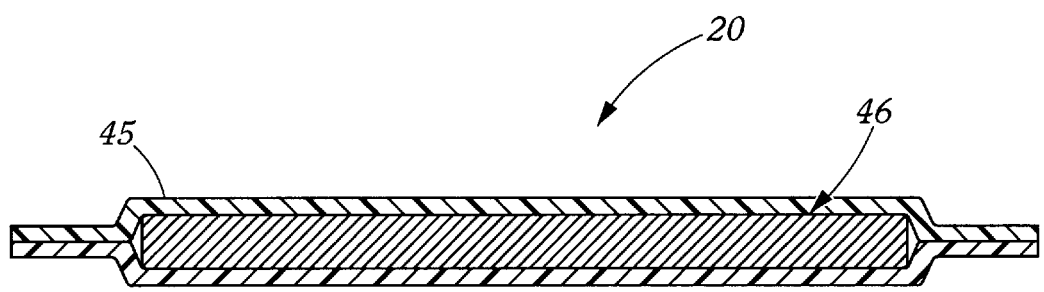
FIG. 4 is a cross-sectional view taken along lines 4—4 of FIG. 3.

As illustrated in FIGS. 3 and 4, the tire liner 20 comprises a thin lightweight puncture resistant flexible strip of aluminum 46 to protect the inner tube 35 from puncture damage and a polyurethane protective tape 45 which is applied to major first and second surfaces of the lightweight puncture resistant flexible strip of aluminum to give added protection against puncture and enhance the strength and durability of the aluminum strip 46. The polyurethane protective tape also prevents the the puncture resistant flexible metal strip from accordioning and covers the edges of the puncture resistant flexible aluminum metal strip to prevent it from abrading the inner tube 35 and outer tire 37.

The polyurethane protective tape may be secured in position by an adhesive or by heat fusing overlapping portions together and to the adjacent portions of the puncture-resistant flexible aluminum metal strip 46 as would be readily understood by those skilled in the art.

The protective liner 20 may have an overall length in a range of 12 to 96 inches to thereby accommodate a range of typical bicycle wheel sizes as would be readily understood by those skilled in the art. Thus the protective tire liner may be overlapped at its ends. Accordingly, the polyurethane protective tape 45 may also cover and protect at least the end edge exposed to the inner tube 35. The polyurethane protective tape 45 may also cover both end edges 46c, 46d of the puncture resistant flexible aluminum metal strip 46 for ease of installation.

While the present invention is primarily directed to a flexible tire liner which is inserted into the bicycle tire, another embodiment of the invention is to place or mold the liner directly into the outer tire itself.

The protective liner 20 protects the inner tube 35 from puncture damage, such as from the illustrated thorn 55 (FIG. 2) and other sharp objects as are commonly encountered when off road biking. In particular, as illustrated, because the protective liner is not secured to or molded into the outer tire 37, it may more readily move relative to the outer tire to thereby deflect a sharp object tip, such as the case of the illustrated thorn 55.

The lightweight puncture resistant flexible aluminum strip 46 has a thickness of 0.002"–0.035" and a width of 0.125"–3.500". Other metals may be used if they have overall properties similar to the aluminum. The unreinforced polyurethane protective tape 45 is available from 3M with a preferable thickness of 0.005"–0.050" and a width of 0.0625"–4.500".

The present invention provides a new and improved tire liner and a method for providing puncture protection for bike tires. The method comprises the steps of forming a protective tire liner by providing a thin elongated lightweight puncture resistant flexible recycled aluminum strip 46 and covering it on all sides and edges with a polyurethane protective tape, and positioning the protective tire liner between the bicycle inner tube and the bicycle outer tire 37.

The present invention should not be limited in its application to the details and construction illustrated in the accompanying drawings or the specification, since numerous modifications and variations will become obvious to those of ordinary skill in the art in view of the applicants' teachings and within the scope of the appended claims.

I claim:

1. A bicycle wheel comprising:
  a generally circular bicycle rim;
  a bicycle inner tube positioned around said bicycle rim;
  a bicycle outer tire covering said bicycle inner tube and being secured to said bicycle rim;
  a protective tire liner positioned between said bicycle inner tube and said bicycle outer tire, said protective tire liner comprising,
    thin elongated lightweight puncture-resistant flexible metallic_strip positioned to extend around a periphery of said inner tube to protect said inner tube from puncture damage, and unreinforced polyurethane protective tape, said unreinforced polyurethane protective tape covering all sides and edges of, said puncture-resistant flexible metallic strip, and_ secured thereto by adhesive, preventing the thin elongated lightweight puncture resistant flexible metal strip from accordianing.

2. A bicycle wheel as defined in claim 1 wherein said thin elongated lightweight puncture resistant flexible metallic strip is made of aluminum and has a thickness of 0.002"–0.035".

3. A bicycle wheel as defined in claim 1 wherein said thin elongated lightweight puncture resistant flexible metallic strip is made of aluminum and has a width of 0.125"–3.500".

4. A method for protecting a bicycle inner tube for a bicycle wheel comprising a generally circular bicycle rim, the bicycle inner tube positioned about the bicycle rim, and a bicycle outer tire covering the bicycle inner tube and secured to the bicycle rim, the method comprising the steps of:

forming a protective tire liner by providing a thin elongated puncture-resistant flexible aluminum strip and polyurethane protective tape, said polyurethane protective tape adhesively adhered to all sides and edges of said thin elongated puncture-resistant flexible aluminum strip to prevent the aluminum strip from accordianing when installed and positioning the protective tire liner to extend around the periphery of the bicycle inner tube between the bicycle inner tube and the bicycle outer tire.

\* \* \* \* \*